United States Patent
Hogendoorn et al.

(10) Patent No.: US 9,995,610 B2
(45) Date of Patent: Jun. 12, 2018

(54) METHOD FOR OPERATING A NUCLEAR MAGNETIC FLOWMETER

(71) Applicant: Krohne AG, Basel (CH)

(72) Inventors: Cornelis Johannes Hogendoorn, Sijk (NL); Rutger Reinout Tromp, Dordrecht (NL)

(73) Assignee: Krohne AG, Basel (CH)

( * ) Notice: Subject to any disclaimer, the term of this patent is extended or adjusted under 35 U.S.C. 154(b) by 587 days.

(21) Appl. No.: 14/629,548

(22) Filed: Feb. 24, 2015

(65) Prior Publication Data

US 2015/0241258 A1 Aug. 27, 2015

(30) Foreign Application Priority Data

Feb. 24, 2014 (DE) .................. 10 2014 002 393
Jul. 4, 2014 (DE) .................. 10 2014 009 902

(51) Int. Cl.
*G01F 1/00* (2006.01)
*G01F 1/716* (2006.01)

(52) U.S. Cl.
CPC .................... *G01F 1/716* (2013.01)

(58) Field of Classification Search
CPC ........................................... G01F 1/716
See application file for complete search history.

(56) References Cited

U.S. PATENT DOCUMENTS

| | | | | |
|---|---|---|---|---|
| 4,546,649 A | | 10/1985 | Kantor | |
| 5,408,180 A | * | 4/1995 | Mistretta | G01F 1/716 |
| | | | | 324/306 |
| 5,684,399 A | * | 11/1997 | Bayer | G01F 1/716 |
| | | | | 324/300 |
| 2008/0174309 A1 | * | 7/2008 | Pusiol | G01F 1/56 |
| | | | | 324/306 |
| 2012/0092007 A1 | * | 4/2012 | Li | G01F 1/716 |
| | | | | 324/306 |
| 2014/0049257 A1 | * | 2/2014 | Rapoport | G01F 1/716 |
| | | | | 324/306 |
| 2015/0338256 A1 | * | 11/2015 | Hogendoorn | G01F 1/716 |
| | | | | 324/306 |
| 2016/0202100 A1 | * | 7/2016 | Hogendoorn | G01N 24/081 |
| | | | | 324/306 |

* cited by examiner

*Primary Examiner* — Evren Seven
(74) *Attorney, Agent, or Firm* — David S. Safran

(57) ABSTRACT

A method for operating a nuclear magnetic flowmeter having a measuring device for determining the flow of the medium through the measuring tube, the measuring device having a magnetic field generator for generating a magnetic field permeating the medium and the measuring tube and for carrying out nuclear magnetic measurements of measuring volumes that are adjustable in position and size in the magnetic field. The nuclear magnetic measurements involve adjusting the size of the measuring volume, positioning the measuring volume, generating excitation signals for exciting the medium, transmitting excitation signals into the measuring volume and measuring echo signals caused by the excitation signals. Deposits on the inner wall of the measuring tube are determined from echo signals of all nuclear magnetic measurements assigned to the position of the measuring volume of the respective nuclear magnetic measurement and at least one abrupt change in the echo signals detected.

11 Claims, No Drawings

METHOD FOR OPERATING A NUCLEAR MAGNETIC FLOWMETER

BACKGROUND OF THE INVENTION

Field of the Invention

The invention relates to a method of operating a nuclear magnetic flowmeter having a measuring tube that can have medium flowing through it and having a measuring device designed for determining the flow of the medium through the measuring tube, wherein the measuring device has a magnetic field generator for generating a magnetic field permeating the medium and the measuring tube and is designed for carrying out nuclear magnetic measurements of measuring volumes adjustable in position and size in the magnetic field, and wherein each of the nuclear magnetic measurements includes adjusting the size of the measuring volume, positioning the measuring volume, generating excitation signals for exciting the medium, transmitting excitation signals into the measuring volume and measuring echo signals caused by the excitation signals.

Description of Related Art

The atomic nuclei of the elements that have nuclear spin also have a magnetic moment caused by the nuclear spin. The nuclear spin can be regarded as angular momentum describable by a vector and correspondingly, the magnetic moment can also be described by a vector, which is oriented parallel to the vector of the angular momentum. If a macroscopic magnetic field is present, the vector of the magnetic moment of the atomic nucleus tends to orient itself parallel to the vector of the macroscopic magnetic field at the atomic nucleus. Here, the vector of the magnetic moment of the atomic nucleus precesses around the vector of the macroscopic magnetic field at the atomic nucleus. The circular frequency of the precession is called Larmor frequency and is the product of the gyromagnetic ratio and the magnitude of the magnetic flux density at the atomic nucleus. Consequently, the Larmor frequency is proportional to the magnitude of the magnetic flux density at the atomic nucleus. The gyromagnetic ratio is at a maximum for hydrogen nuclei.

Several atomic nuclei in a volume, each of which has a magnetic moment, do not have a macroscopic magnetization when there is no macroscopic magnetic field due to the statistical uniform distribution of the orientations of the individual magnetic moments of the atomic nuclei. The presence of a macroscopic magnetic field disrupts the statistical uniform distribution of the orientations of the individual magnetic moments of the atomic nuclei and a macroscopic magnetization develops parallel to the macroscopic magnetic field. The chronological sequence of orienting the magnetic moments in the macroscopic magnetic field is characterized by the spin-lattice relaxation time constant and has an exponentially decreasing progression. The value of the spin-lattice relaxation time constant is, in turn, characteristic for different substances.

The medium flowing through the measuring tube can contain one or more phases. In the case of a single-phase medium, determining the flow is carried out by determining the flow velocity of the medium in the measuring tube. Determining the flow of a multi-phase medium includes, in addition to determining the flow velocity through the measuring tube of each of the phases, also the determination of the portion of each of the phases in the medium.

Determination of the portions of the phases in the medium requires that each phase of the medium has atomic nuclei with magnetic moments so that the phases can be magnetized in a magnetic field and that the phases of the medium have different spin-lattice relaxation time constants. The multi-phase medium extracted from oil sources consists essentially of the two liquid phases crude oil and water and the gas phase natural gas, wherein all phases contain hydrogen nuclei and have different spin-lattice relaxation time constants. For this reason, nuclear magnetic flowmeters of the type described above are particularly suitable for measuring the flow of multi-phase mediums extracted from oil sources.

Measuring methods for determining the portions of individual phases in the medium provide that the magnetization of the medium is determined after different exposure times of the magnetic field generated by the magnetic field generator on the medium. The determination of the magnetization of the medium after a certain exposure time of the magnetic field is carried out by the measuring device in that excitation signals are generated for the medium, the excitation signals are transmitted into the medium and the echo signals caused by the excitation signals are measured. More developed measuring methods provide that, in a nuclear magnetic measurement, the echo signals are measured only in one measuring volume, wherein the measuring volume is positioned in the magnetic field and a size is set by the measuring device.

The vectors of the magnetic moment of the individual atomic nuclei that are precessing uncorrelated before excitation of the medium are correlated by the excitation, which initially means fixed phase relationships between the precessing vectors of the magnetic moment. However, the correlation decreases exponentially with the passing of time after the excitation due to different mechanisms, which is called de-phasing and is characterized here by the spin-spin relaxation time constant. The value of the spin-spin relaxation time constant is characteristic for different substances. Accordingly, the echo signals have a harmonic oscillation, which is characterized by the Larmor frequency and an exponentially decreasing amplitude.

When operating nuclear magnetic flowmeters of the type described above, in particular when being used for flow measurements of a medium from oil sources, deposits can form on the inside of the measuring tube. Together with the deposits, the inside of the measuring tube forms the interface between the flowing medium, on the one hand, and the stationary measuring tube and stationary deposits, on the other hand. The interface thus encompasses the inside of the measuring tube. If there are no deposits, the inside of the measuring tube and the interface are congruent. The deposits reduce the cross section area of the inside of the measuring tube, which leads to a smaller space inside the measuring tube and an increase in the flow resistance. If the reduction of space inside the measuring tube exceeds a tolerable extend for the respective use of the nuclear magnetic flowmeter, and then the deposits are to be removed. It can be assumed that deposits have also formed on the inside of the remaining pipes of the system that have medium flowing through them.

SUMMARY OF THE INVENTION

A primary object of the present invention is thus to provide a method for operating nuclear magnetic flowmeters of the type described above, which provides information about deposits on the inside of the measuring tube.

The above object is initially and essentially met by the method for operating a nuclear magnetic flowmeter as described in the introduction in that a nuclear magnetic measurement is carried out in a measuring volume and at least one further nuclear magnetic measurement is carried out in at least one further measuring volume, in that the measuring volumes are positioned consecutively along a measuring path having a component in the measuring tube cross section plane in such a manner that the total measuring volume formed from the measuring volumes contains at least a portion of the measuring tube wall and at least a portion of the medium, and that the echo signals of all nuclear magnetic measurements are assigned to the position of the measuring volume of the respective nuclear magnetic measurement at the measuring path and at least one abrupt change in the echo signals is detected along the measuring path.

The measuring volumes are positioned consecutively along the measuring path such that two measuring volumes consecutive along the measuring path either overlap or abut one another or that there is spacing along the measuring path between two measuring volumes consecutive along the measuring path. The sizes of the measuring volumes can be chosen as being the same or being different. Although it is only necessary that one component of the measuring path is located in the cross section plane of the measuring tube, the measuring path can be completely located in the cross section plane of the measuring tube. The positioning of the measuring volume along the measuring path, the components of the measuring path in the cross section plane of the measuring tube and the portions of the measuring tube wall contained in the overall volume and the medium together guarantee that the ratio of the volumes of measuring tube wall and medium are different in two consecutive measuring volumes.

The change in the echo signals between two consecutive measuring volumes is always abrupt along the measuring path when the characteristics of the entirety of the substances present in both consecutive measuring volumes are different. The abrupt change of the echo signals can also be described as correspondingly abrupt changes in the slopes of the echo signals. The substances that make up the measuring tube do not contain hydrogen atoms and consequently are not excited by the excitation signals. The deposits are to be differentiated as mineral or paraffinic, or hydrates, especially methane hydrate, wherein paraffinic deposits are also called waxy deposits. Mineral deposits such as limescale deposits do not contain hydrogen atoms and, thus, are not excited by the excitation signals, whereas paraffinic deposits and hydrates do contain hydrogen atoms and are thus, in addition to the medium, excited by the excitation signals. The spin-spin relaxation time constant and the spin-lattice relaxation time constant of the paraffinic deposits and hydrates differ from those of the medium due to the higher viscosity of the paraffinic deposits and hydrates compared to the medium.

Three configurations of deposits on the inside of the measuring tube for describing the method according to the invention will be considered in the following. These are the inner surface of the measuring tube without deposits, the inner surface of the measuring tube with mineral deposits and the inner surface of the measuring tube with paraffinic deposits or hydrates. The three configurations are extreme situations. Often, the deposits are a combination of mineral deposits, paraffinic deposits and hydrates.

If there are no deposits present on the inner surface of the measuring tube, only one abrupt change of the echo signals is detected by the method according to the invention. The abrupt change is in the measuring path at the position of the transition between the inner wall of the measuring tube and the medium and occurs because the wall of the measuring tube, as opposed to the medium, is not excited by the excitation signals. The position of the transition determines a part of the interface.

If mineral deposits are present on the inner surface of the measuring tube, again only one abrupt change of the echo signals is detected by the method according to the invention. The abrupt change is in the measuring path at the position of the transition between the deposits and the medium and occurs because the mineral deposits, as opposed to the medium, are not excited by the excitation signals. The position of the transition determines a part of the interface.

If, however, paraffinic deposits or hydrates are present on the inner surface of the measuring tube, a first abrupt change of the echo signals and a second abrupt change of the echo signals is detected by the method according to the invention. The first abrupt change is in the measuring path at the position of the transition between the inner wall of the measuring tube and the paraffinic deposits and occurs because the wall of the measuring tube, as opposed to the paraffinic deposits, is not excited by the excitation signals. The second abrupt change is at the position of the transition between the paraffinic deposits and the medium and occurs because both the paraffinic deposits and the medium are excited by the excitation signals, but the echo signals of the paraffinic deposits are different than the echo signals of the medium. Thus, the method according to the invention provides the expansion of paraffinic deposits along the measuring path, wherein the expansion corresponds to the distance between the position of the first abrupt change and the position of the second abrupt change in the measuring path. The position of the second transition determines a part of the interface.

Consequently, the method according to the invention determines at least the position of one point in the measuring path located in the interface. Since the alignment of the measuring path in the measuring tube, the geometry of the measuring tube and the usual distribution of the deposits on the inner surface of the measuring tube are known—deposits are usually evenly distributed on the inner surface of the measuring tube—, the reduced cross section area of the inside of the measuring tube can be determined from the position of the point located in the interface. In particular, changes in the expansion of the deposits along the measuring path with the passage of time can be determined with the method according to the invention.

In a preferred implementation of the method according to the invention, it is provided that the measuring volumes are positioned along the measuring path and adjusted in size in such a manner that the area of the total measuring volume in the measuring tube cross section plane completely covers at least the measuring tube cross section area.

Additionally, the measuring volumes can be formed in layers in such a manner that each of the measuring volumes extends between a respective first plane and a respective second plane, wherein the planes are oriented perpendicular to the measuring path. Such a layered measuring volume can be formed in that the magnetic flow density of the magnetic field along the measuring path is provided with a gradient and the excitation signals have a spectrum. Since an excitation of the processing magnetic moments in the magnetic field can only take place with excitation signals, whose frequency is the Larmor frequency and since the Larmor frequency is proportional to the magnetic flux density, a measuring volume can be positioned in the magnetic field and a size can be set in this manner.

The echo signals of a nuclear magnetic measurement in a measuring volume are always an average over the measuring volume. The setting of the expansion of the measuring volume along the measuring path corresponds thus with the resolution of the echo signals along the measuring path. If small expansions of the measuring volume along the measuring path are chosen, the position of the abrupt transition can be determined accordingly exactly in the measuring path.

In a further preferred implementation of the method according to the invention, the expansion of the deposits along the measuring path are determined from the position of the at least one abrupt change of the echo signals and the position of the intersection of the measuring path with the inside of the measuring tube. Since both mineral deposits as well as the wall of the measuring tube are not excited by the excitation signals, echo signals are not created in either the mineral deposits or the wall of the measuring tube. Consequently, there is not an abrupt change of the echo signals that would indicate the position of the transition between the mineral deposits and the inner wall of the measuring tube. As described above, the position of the transition between the paraffinic deposits and the inner wall of the measuring tube in the measuring path can be determined for paraffinic deposits even without knowledge of the intersection of the measuring path with the inner wall of the measuring tube. The position of the first abrupt change of the echo signals corresponds to the position of the intersection of the measuring path with the inner wall of the measuring tube. However, this implementation of the method according to the invention can also be used in the case of paraffinic deposits.

The position of the intersection of the measuring path with the inner wall of the measuring tube can be determined in that the at least one abrupt change of the echo signals is determined in the measuring tube without deposits. If the determination of the intersection occurs immediately after the first start-up of operation of the nuclear magnetic flowmeter, no deposits are present on the inner wall of the measuring tube and only one abrupt change of the echo signals is detected. The position of the abrupt change in the measuring path corresponds to the position of the intersection of the measuring path with the inner wall of the measuring path.

The at least one abrupt change of the echo signals along the measuring path can be detected using different detection methods. Four detection methods will be described in the following. Each of the detection methods itself further develops the method according to the invention; however it can be used in any combination with the remaining detection methods.

The at least one abrupt change of the echo signals along the measuring path is detected in a first detection method in that amplitudes are determined from the echo signals and the at least one abrupt change of the amplitude is detected along the measuring path.

The at least one abrupt change of the echo signals along the measuring path is detected in a second detection method in that the nuclear magnetic measurements are designed for determining spin-lattice relaxation time constants, spin-lattice relaxation time constants are determined from the echo signals and the at least one abrupt change of the spin-lattice relaxation time constants is detected along the measuring path.

The at least one abrupt change of the echo signals along the measuring path is detected in a third detection method in that the nuclear magnetic measurements are designed for determining spin-spin relaxation time constants, spin-spin relaxation time constants are determined from the echo signals and the at least one abrupt change of the spin-spin relaxation time constants is detected along the measuring path.

The at least one abrupt change of the echo signals along the measuring path is detected in a fourth detection method in that the nuclear magnetic measurement is designed for determining velocities of the medium, velocities are determined from the echo signals and the at least one abrupt change of the velocities is detected along the measuring path.

Common to all four of the described detection methods is that they all determine at least the position of one point in the measuring path located in the interface between the flowing medium, on the one hand, and the stationary measuring tube and stationary deposits, on the other hand, wherein the position is identified by the at least one abrupt change of the respective factor. The detection of the interface is independent of the type of deposit, regardless of mineral and/or paraffinic.

Furthermore, the first, second and third detection methods also detect a second abrupt change of the respective factor in paraffinic deposits. The second abrupt change of the respective factor is at the position of the transition between the paraffinic deposits and the wall of the measuring tube. Hence, the first, second and third detection methods provide information about the expansion of paraffinic deposits along the measuring path.

In a further preferred implementation of the method according to the invention, it is provided that the at least one abrupt change of the echo signals is detected along at least one further measuring path. Since at least one part of the interface is determined by the at least one abrupt change of the echo signals along each of the measuring paths, the interface is mapped using several measuring paths. If the deposits are paraffinic, the inner surface of the measuring tube is also mapped using the abrupt changes of the echo signals along each of the measuring paths. The spatial expansion of paraffinic deposits can be determined from the interface and the inner surface of the measuring tube.

In the method according to the invention, at least two of the measuring paths can be arranged opposite one another on one axis. This arrangement simplifies and accelerates the measuring method, since only half of the measuring paths need to be positioned. Furthermore, the spacing of the interface along the axis is directly determined in the arrangement of two opposing measuring paths on one axis. The cross section area of the inside of the measuring tube and thus the flow resistance can be determined from the spacing of the interface.

The object described above forming the basis of the invention is further met in that a tomographic measurement is carried out over the entire measuring tube cross section with the measuring device, that the amplitudes of the echo signals are determined pixel-by-pixel and that at least two abrupt changes of the amplitudes of the echo signals are detected over the measuring tube cross section in the amplitudes of the echo signals determined pixel-by-pixel.

As already described, a change in the echo signals—presently the amplitudes of the echo signals—is always abrupt when the characteristics of the measured substances change, i.e. in particular when the substance changes.

The method according to the invention has the advantage of characterizing the state of the measuring tube with one, single tomographic measurement over the entire measuring tube cross section, in particular of detecting deposits on the inner walls of the measuring tube.

Different possibilities are now provided according to the invention for more concretely designing the method according to the invention.

DETAILED DESCRIPTION OF THE INVENTION

It is provided in a preferred implementation of the invention to determine the amplitudes of the echo signals pixel-by-pixel along a secant of the measuring tube cross section. In particular, it is advisable to determine the amplitudes of the echo signals pixel-by-pixel along a diameter of the measuring tube cross section.

As already described—the measuring tube does not have any hydrogen atoms that can be excited using the excitation signals. Accordingly, they do not transmit echo signals that could be detected, i.e., the measured amplitude is zero. If mineral deposits are located on the inner wall of the measuring tube, which also have no hydrogen atoms, the amplitude of the measured echo signals in the area of the mineral deposits is also zero. There is an abrupt change in the amplitude of the measured echo signal at a transition from the inner wall of the measuring tube or mineral deposit to the medium flowing through the measuring tube, since the medium has hydrogenous phases. Thus a first abrupt change of amplitude of the echo signals is detected at the transition between measuring tube or mineral deposit and medium. If the amplitudes of the echo signals are further followed along the secants or diameters, there is a second abrupt change of the amplitudes of the measuring signals exactly when a further transition from hydrogenous medium to mineral deposit or measuring tube occurs, seen along the secant.

If there are paraffinic deposits or hydrates, in particular methane hydrate—summarized as paraffinic deposits in the following—on the inner wall of the measuring tube, a first abrupt change of the amplitudes of the echo signals is detected along a secant of the measuring tube cross section by the method according to the invention, exactly then, when there is a transition between measuring tube and paraffinic deposit. The abrupt change occurs because, as opposed to the paraffinic deposit, the measuring tube wall is not excited by the excitation signals. A second abrupt change in the amplitudes of the echo signals is detected at the transition from paraffinic deposit to the medium flowing through the measuring tube. The paraffinic deposit and the medium both contain hydrogen atoms excitable by the excitation signals, so that echo signals are transmitted from both the paraffinic deposits and the medium, however, the echo signals differ in their amplitude so that an abrupt change in the amplitude can be detected.

A third and fourth abrupt change of the amplitudes of the echo signals can be detected along the secants at the locations, on the one hand, at which the transition from the medium to the paraffinic deposits is located and, on the other hand, at which the transition from the paraffinic deposits to the measuring tube is located.

A further, preferred implementation of the method according to the invention provides that the amplitudes of the echo signals are determined pixel-by-pixel over the entire measuring tube cross section. Abrupt changes in the amplitudes of the echo signals over the measuring tube cross section can also be detected in the implementation according to the invention.

The method according to the invention determines the position of the transitions of two substances, in particular the transition from the medium flowing through the measuring tube to the deposits and, in the case of paraffinic deposits, additionally the position of the transition between paraffinic deposits and measuring tube.

Thus, the expansion of the deposits on the measuring tube wall can be determined with the method according to the invention. If paraffinic deposits are found on the measuring tube wall and it is assumed that the deposits are deposited uniformly on the measuring tube wall, the expansion of the deposits is clearly determined by determining the amplitudes of the echo signals along a secant, in particular a diameter, of the measuring tube cross section using the distance between the first and the second and/or the distance between the third and the fourth abrupt change of the echo signals. In particular, it should be taken into consideration here, that the position of the secants in the measuring tube cross section are to be considered in determining the expansion of the deposits.

If mineral deposits are found on the inner wall of the measuring tube, the expansion of the deposits can be determined in that the diameter of the measuring tube reduced by deposits is determined using the distance of the positions of the first and the second abrupt changes of echo amplitudes along a secant, in particular along a diameter, of the measuring tube cross section. The expansion of the deposits is a result of the difference between actual and reduced diameter using the known diameter of the measuring tube without deposits.

If the amplitudes of the echo signals over the entire measuring tube cross section are determined, the reduced diameter of the measuring tube and thus the expansion of the mineral deposits can be determined—in the case of mineral deposits.

If paraffinic deposits are present, the expansion of the paraffinic deposits on the measuring tube wall result directly from the distribution of the amplitudes of the echo signals over the measuring tube cross section.

In particular, also irregularly distributed deposits on the measuring tube wall can be clearly determined by determining the amplitudes of echo signals over the entire measuring tube cross section as well as by determining the positions of the abrupt changes in the amplitudes of echo signals in the entire measuring tube cross section.

In particular, the method according to the invention is advantageous in determining changes in the expansion of the deposits over time.

In a particularly preferred embodiment of the method according to the invention, it is provided that at least one further tomographic measurement is carried out over the entire measuring tube cross section, wherein the measurements are staggered over time, that the echo signals of the at least on further measurement are determined pixel-by-pixel and that the relaxation times and/or the flow velocity of the medium are determined pixel-by-pixel using the changes of the echo signals of identical pixels over time.

The determination of amplitudes of the echo signals can also occur, here, along a secant, in particular along a diameter, of the measuring tube cross section or over the entire measuring tube cross section.

In the embodiments described above of the method according to the invention, different variations can be provided for encoding location information necessary for tomography.

In this manner, a gradient field is already created before the excitation of the medium with the excitation pulse. Then, the nuclear spins are already precessing before the location-dependent excitation with different Lamor frequencies; a certain part of the spin can be chosen using the pulse width of the excitation pulse, which is then excited. Thus, there is a selective excitation of the medium, hence only the selected part transmits an echo signal.

It is also possible to encode the location information using a phase-shift of the spin. A gradient field is created between exciting the medium using an excitation pulse and measuring the echo signals generated by the medium for a certain timespan. The precession frequencies experience a location-dependent change by the gradient field, since the Lamor frequency is proportional to the strength of the magnetic field. If the gradient field is turned off again, the spins precess again at their "original" frequency, however, there was a location-dependent change of the phase position of the excited spin, this is called phase encoding.

It can also be provided that the spins are excited with an excitation pulse and then a gradient field is created during read-out ("read-out gradient field"). This leads to the spins transmitting signals with location-dependent, different frequencies during measurement. The measured "frequency mixture" can be encoded using a Fourier transformation. An encoding of location information is thus possible using frequency, this is called frequency encoding.

What is claimed is:

1. Method for operating a nuclear magnetic flowmeter having a measuring tube through which a medium is flowable and having a measuring device for determining the flow of the medium through the measuring tube, the measuring device having a magnetic field generator for generating a magnetic field permeating the medium and the measuring tube for carrying out nuclear magnetic measurements in measuring volumes that are adjustable in position and size in the magnetic field, comprising the steps of:

performing nuclear magnetic measurements during each of which adjusting of the size of the measuring volume, positioning of the measuring volume, generating excitation signals for exciting the medium, transmitting excitation signals into the measuring volume and measuring echo signals caused by the excitation signals are performed, carrying out a first of the nuclear magnetic measurements in a measuring volume and carrying out at least one second nuclear magnetic measurement in at least one additional measuring volume, the measuring volumes being positioned one after the other along a measuring path having a component in a measuring tube cross section plane in such a manner that the total measuring volume formed from the measuring volumes contains at least a portion of the measuring tube wall and at least a portion of the medium, and assigning the echo signals of all nuclear magnetic measurements to the position of the measuring volume of the respective nuclear magnetic measurement at the measuring path and detecting at least one abrupt change in the echo signals along the measuring path.

2. Method according to claim 1, wherein the measuring volumes are positioned along the measuring path and adjusted in size in such a manner that the area of the total measuring volume in the measuring tube cross section plane completely covers at least the measuring tube cross section area.

3. Method according to claim 1, wherein the measuring volumes are formed in layers such that each measuring volume extends between a respective first plane and a respective second plane, and wherein the planes are oriented perpendicular to the measuring path.

4. Method according to claim 1, wherein the extent of deposits along the measuring path is determined from the position of the at least one abrupt change of the echo signals and a position of the intersection of the measuring path with the measuring tube inner wall.

5. Method according to claim 4, wherein the position of the intersection of the measuring path with the measuring tube inner wall is determined and wherein the at least one abrupt change of the echo signals is determined in the measuring tube without deposits.

6. Method according to claim 1, wherein the at least one abrupt change of the echo signals along the measuring path is determined and at least one abrupt change in the amplitudes of the echo signals along the measuring path is detected from the echo signals.

7. Method according to claim 1, wherein the at least one abrupt change of the echo signals along the measuring path is determined the nuclear magnetic measurements are adapted for determining the spin-lattice relaxation time constant, spin-lattice relaxation time constants are determined from the echo signals and the at least one abrupt change of the spin-lattice relaxation time constant is determined along the measuring section.

8. Method according to claim 1, wherein the at least one abrupt change of the echo signals along the measuring path is determined and the nuclear magnetic measurements are adapted for determining spin-spin relaxation time constants, spin relaxation time constants are determined from the echo signals and the at least one abrupt change of the spin-spin relaxation time constants is detected along the measuring path.

9. Method according to claim 1, wherein the at least one abrupt change of the echo signals is detected along the measuring path in that the nuclear magnetic measurements are adapted for determining velocities of the medium, velocities are determined from the echo signals and the at least one abrupt change of the velocities is detected along the measuring path.

10. Method according to claim 1, wherein the at least one abrupt change of the echo signals is detected along at least one further measuring path.

11. Method according to claim 10, wherein at least respectively two of the measuring paths are arranged opposite one another on an axis.

* * * * *